(12) United States Patent
Secretan et al.

(10) Patent No.: US 9,785,955 B2
(45) Date of Patent: Oct. 10, 2017

(54) OPTIMIZATION OF YIELD FOR ADVERTISING INVENTORY

(75) Inventors: Jimmy Secretan, Orlando, FL (US); Daniel Jaye, Celebration, FL (US)

(73) Assignee: Operative Media, Inc., New York, NY (US)

(*) Notice: Subject to any disclaimer, the term of this patent is extended or adjusted under 35 U.S.C. 154(b) by 1205 days.

(21) Appl. No.: 13/245,251

(22) Filed: Sep. 26, 2011

(65) Prior Publication Data

US 2013/0006730 A1 Jan. 3, 2013

Related U.S. Application Data

(60) Provisional application No. 61/502,081, filed on Jun. 28, 2011.

(51) Int. Cl.
*G06Q 30/02* (2012.01)

(52) U.S. Cl.
CPC .................................... *G06Q 30/02* (2013.01)

(58) Field of Classification Search
CPC ............ G06Q 30/0277; G06Q 30/0241; G06F 3/0484; G06F 3/048
See application file for complete search history.

(56) References Cited

U.S. PATENT DOCUMENTS

| | | | |
|---|---|---|---|
| 2001/0032126 A1* | 10/2001 | Macartney-Filgate et al. | 705/14 |
| 2002/0077891 A1* | 6/2002 | Castle et al. | 705/14 |
| 2003/0018778 A1* | 1/2003 | Martin et al. | 709/224 |
| 2003/0055729 A1* | 3/2003 | Bezos et al. | 705/14 |
| 2003/0135853 A1* | 7/2003 | Goldman et al. | 725/34 |
| 2003/0167350 A1* | 9/2003 | Davis et al. | 709/316 |
| 2003/0191801 A1* | 10/2003 | Paul | 709/203 |
| 2004/0049598 A1* | 3/2004 | Tucker et al. | 709/246 |
| 2005/0267799 A1* | 12/2005 | Chan | G06Q 30/0251 705/14.49 |
| 2006/0036488 A1* | 2/2006 | Golan et al. | 705/14 |
| 2006/0122879 A1* | 6/2006 | O'Kelley | 705/14 |
| 2007/0055569 A1* | 3/2007 | Subramanian et al. | 705/14 |
| 2007/0174247 A1* | 7/2007 | Xu | G06F 17/30722 |
| 2007/0271145 A1* | 11/2007 | Vest | 705/14 |
| 2009/0083147 A1* | 3/2009 | Paila | G06Q 30/0273 705/14.69 |
| 2009/0132366 A1* | 5/2009 | Lam et al. | 705/14 |

(Continued)

*Primary Examiner* — Vincent Cao
(74) *Attorney, Agent, or Firm* — Dentons US LLP

(57) ABSTRACT

Methods and apparatus, including computer program products, for optimization of yield for advertising inventory. A method includes, in a network of interconnected computers, sending a request for a file from a browser residing on a user system to a publisher server, receiving the requested file from the publisher server, the requested file including instructions for the browser to request a site file from a rules server, receiving the site file in the browser, the site file including rules for deciding whether an advertising impression is desired, rules for valuing the advertising impression, and browser executable code that applies and evaluates the rules, executing the browser executable code to evaluate the rules from the site file which determine if one or more signals should be attached to an advertisement request, and selecting an advertisement from a network ad server based on a signal received with the advertisement request from the browser.

29 Claims, 2 Drawing Sheets

(56) References Cited

U.S. PATENT DOCUMENTS

2009/0198580 A1* 8/2009 Broberg ............... G06Q 30/02
  705/14.1
2009/0271256 A1* 10/2009 Toebes et al. ................ 705/14
2010/0198694 A1* 8/2010 Muthukrishnan .......... 705/14.71
2010/0257035 A1* 10/2010 Karmon et al. ........... 705/14.11
2010/0262487 A1* 10/2010 Edwards et al. .......... 705/14.43

* cited by examiner

100

Send a request for a file from a browser to a publisher server
102

Receive the requested file from the publisher server, the
file including instructions for the browser to request a site
file from a rules server
104

Send the requested site file to the browser, the site file containing
rules for deciding whether an advertising impression is
desired and a value of the advertising impression in addition to
code to execute on the browser that applies and evaluates those rules
106

Execute the code in the site file
108

Evaluate the rules from the site file that determine if one or
more codes referred to as signals should be attached to the specific
ad request that is sent to the publisher ad server.
110

Select an advertisement from a network ad server based on the
signal received with the advertisement request from the browser
112

FIG. 2

OPTIMIZATION OF YIELD FOR ADVERTISING INVENTORY

CROSS-REFERENCE TO RELATED APPLICATIONS

This application claims the benefit of U.S. Provisional Application No. 61/502,081, filed Jun. 28, 2011, and titled OPTIMIZATION OF YIELD FOR ADVERTISING INVENTORY, which is incorporated by reference in its entirety.

BACKGROUND OF THE INVENTION

The invention generally relates computer systems and computer executed methods of optimization of yield for advertising inventory.

Direct mail, newspaper, and television are slowly becoming the past for companies to build their brand name, public image, and to bring awareness to their new products. By contrast, the online advertising market has accelerated in recent years. One of the most significant contributors to the online advertising market is the rapid influx of ad networks. As the amount of websites grow online and people using those websites increases, more ad networks are expected to emerge to serve as brokers for advertisers. Today, the online advertising market is an ever-expanding market fragmented by ad spending that has spread among 300+ disparate advertising networks worldwide including Google's AdSense, Yahoo!'s Publisher Network, HispanoClick, and Adtegrity.

Currently, ad networks allow website publishers to generate revenue by placing advertisements from the ad networks on their webpages. In many web applications and on many websites, advertisements are presented in the form of banners, graphic squares, text advertisements, video advertisements, pop-up and pop-under advertisements, Flash or other animated advertisements that move across the screen, etc., and displayed prominently on a web display, referred to as a "webpage." Users attracted to an advertisement often "click" on the advertisement by positioning a screen cursor on the advertisement and then depressing a button on a mouse or other input device. By clicking on the advertisement, a "hyperlink" to another website, associated with the advertisement and usually the home site of the advertiser, generates a path to the advertiser's designated page. Typically, the name of the path is presented to the user in the form of a uniform resource locator ("URL"), such as "ABC—Inc.com," followed by a directory path designating the particular page in the site that the advertiser wishes to be displayed, such as "/directory 13 name/page—name."

One question still remains, i.e., how to intelligently optimize yield for advertising inventory delivered by a publisher server based on third party demand.

SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention provides methods and apparatus, including computer program products, for optimization of yield for advertising inventory.

In general, in one aspect, the invention features a method including, in a network of interconnected computers, sending a request for a file from a browser residing on a user system to a publisher server, receiving the requested file from the publisher server, the requested file including instructions for the browser to request a site file from a rules server, receiving the site file in the browser, the site file including rules for deciding whether an advertising impression is desired, rules for valuing the advertising impression, and browser executable code that applies and evaluates the rules, executing the browser executable code to evaluates the rules from the site file which determine if one or more signals should be attached to an advertisement request, and selecting an advertisement from a network ad server based on a signal received with the advertisement request from the browser.

In another aspect, the invention features a method including, in a network of interconnected computers, requesting a file from a publisher server, receiving the requested file in a browser, the requested file including instructions for the browser to request a tag file of executable code from a rules server, and receiving the tag file including one section containing executable code and a second section containing content markup language with embedded executable code, the tag file containing instructions for the browser to ignore the section of the tag file containing the content markup language with embedded executable code when the browser is processing the file as the executable code, the section with the executable code surrounded by characters indicating that the browser should ignore that section when the browser is processing the tag file as a content markup language file.

Other features and advantages of the invention are apparent from the following description, and from the claims.

BRIEF DESCRIPTION OF THE DRAWINGS

The invention will be more fully understood by reference to the detailed description, in conjunction with the following figures, wherein:

FIG. 2 is a flow diagram.

DETAILED DESCRIPTION

Figure 1:
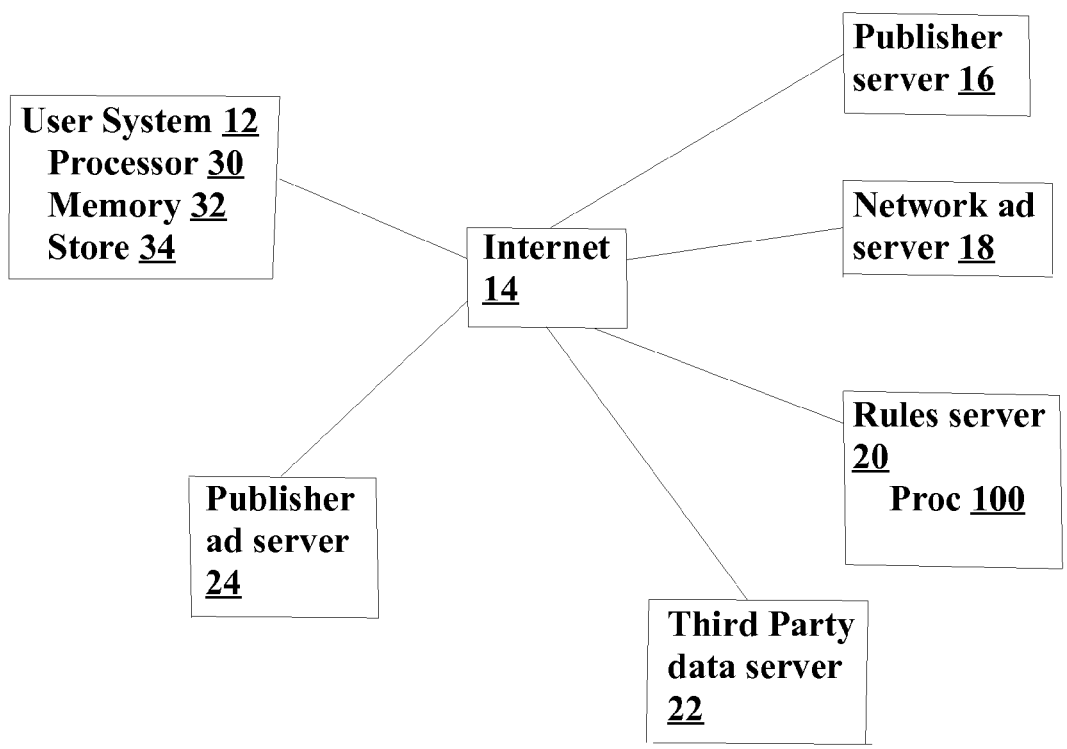
FIG. 1 is a block diagram.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "system," "platform," and the like can refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As shown in FIG. 1, an exemplary network 10 includes a user system 12 linked to a network of interconnected computers 14, e.g., the Internet. In various implementations, the network 10 can include a publisher server 16, a network ad server 18, a rules server 20, one or more third party data servers 22 and a publisher ad server 24. Each of the servers 16, 18, 20, 22 and 24 can include a processor, memory and store. Memory can include an operating system, such as Linux or Windows®, and one or more processes. The store can reside within memory or on a storage device and contain structured or unstructured data residing in a database management system.

The user system 12 can include a processor 30, memory 32 and store 34. Memory 32 can include an operating system, such as Linux, Snow Leopard® or Windows®, and a browser, such as Firefox®, Opera®, Chrome® or Internet Explorer®, for example. In general, a browser is a software application for retrieving, presenting, and traversing information resources on the World Wide Web (WWW). An information resource is identified by a Uniform Resource Identifier (URI) and may be a web page, image, video, or other piece of content. Hyperlinks present in resources enable users easily to navigate their browsers to related resources. More specifically, a hyperlink (or link) is a reference to a document that the reader can directly follow, or that is followed automatically. A hyperlink points to a whole document or to a specific element within a document.

Example user systems include desktop computers, laptops, notebooks, netbooks, tablets and smart cellular devices such as smart phones and personal data assistants (PDAs).

The publisher server 16 is a web site with a collection of HyperText Markup Language (HTML) pages generally referred as content. Example publisher servers include www.cars.com, www.nytimes.com and www.boston.com. Pages served up by the publisher server 16 usually contain portions or space(s) for the insertion of advertisements, i.e., the non-personal communication of information usually paid for and usually persuasive in nature, about products (i.e., goods and services) or ideas by an identified sponsor. Pages served will include one or more requests to a network ad server or servers to deliver one or more advertisements to the available space on the web page.

The network ad server 18 is a computer server, specifically a web server, that stores advertisements used in online marketing and delivers them to website visitors. The content of the web server is constantly updated so that the website or web page on which the ads are displayed contains new advertisements, e.g., banners (static images/animations) or text, when the site or page is visited or refreshed by a user. The network ad server 18 can also perform various other tasks like counting the number of impressions/clicks for an ad campaign and report generation, which helps in determining a return on investment (ROI) for an advertiser on a particular website. In general, an ad campaign is a series of advertisement messages that share a single idea and theme which make up an integrated marketing communication. Advertising campaigns appear in different media across a specific time frame.

The rules server 20 includes one or more site files. A site file contains rules for deciding whether an advertising impression is desired and a value of the advertising impression in addition to code to execute on the browser that applies and evaluates those rules. The rules server also includes a federated real time bidding process 100, fully described below, which enables a third party to intelligently optimize yield for advertising inventory controlled by a publisher by informing the publisher's advertising management system in real time of the value of each advertising impression. The publisher's ad server can then use this value information to make an optimal decision on which ad to serve.

The one or more third party data servers 22 store content that can be served up to a user's browser upon request. This data may include information gathered about the browser over time and across multiple servers in the network.

The publisher ad server 24 is a computer server that controls the display of advertisements on the publisher's behalf. The user's browser makes a request to the publisher ad server 24 when directed to do so by content sent to the browser from the publisher's website. The publisher ad server 24 can make a decision, either in real time or in a predetermined manner, about which advertisements are important to serve to visitors of the publisher website. The publisher ad server 24 can store information about the different cost values, volumes and other metrics of campaigns which the publisher has agreed to display to the user's browser on its website. The publisher ad server 24 can accept parameters at the time of the request that can influence its decision about which advertisements to serve. The publisher ad server 24 may perform similar functions to the network ad server, serving ad content, e.g. banners, animations, text, video to the user's browser. The publisher ad server 24 may also send code the user's browser that directs it to serve an advertisement from a network ad server 18.

As shown in FIG. 2, the federated real time bidding process 100 includes sending (102) a request for a file from a browser to a publisher server and receiving (104) the requested file from the publisher server, the file including instructions for the browser to request a site file from a rules server.

The rules server sends (106) the requested site file to the browser, the site file containing executable rules for deciding whether an advertising impression is desired and a value of the advertising impression in addition to executable code on the browser that applies and evaluates those rules.

The browser executes (108) the code in the site file. For each advertisement the browser requests from the publisher ad server, the code in the site file executed by the browser evaluates (110) the rules from the site file that determine if one or more codes referred to as signals should be attached to the specific ad request. The publisher ad server may select (112) an advertisement from a network ad server based on the signal received with the advertisement request from the browser.

The rules in the site file received in the browser can depend on data about the browser gathered over time and across multiple servers in the network, characteristics of the ad request, how many times each signal has previously been included in ad requests from the browser to the publisher ad server or how many times each signal has previously been included in ad requests from the browser to the publisher ad server.

The rules in the site file received in the browser can depend on one or more characteristics of content within which the advertisement is displayed, including the Universal Resource Locator (URL) or other unique identifier of the content, codes that correlate to a subject, nature and format of the content, an identity and role of a business entity in an authorship, production, edition and distribution of the content.

The rules in the site file received in the browser can depend on a location and placement of the advertisement within content, a geographic location of the browser or on rules which cause the signals to be included on only a percentage of the ad requests when the signal would otherwise have been included.

The rules in the site file received in the browser can depend on rules which cause the signals to be included on the ad requests when a combination of available data predict a likelihood of a specific goal above a threshold.

The available data can be selected from the group including data about the browser, ad request characteristics, content characteristics, characteristics of the actual advertising message, and a number of times the signal was previously included.

The goal can be a purchase transaction conducted using the browser or a purchase transaction linked to the available data but not conducted using the browser, including purchases made using other communications channels or in person.

The threshold for including the signal based on a prediction can also depend on a value assigned to the goal.

Files subsequently requested from the publisher server can be retrieved from a locally cached copy of the site file if the subsequent requests happen within a prescribed period of time.

Process 100 may include requesting additional files from the publisher server and receiving a locally cached copy of the site file if the subsequent requests happen within a prescribed period of time.

The site file may further include instructions that determine how often new data about the browser should be retrieved.

The site file can be a cached copy that loads new data without rules evaluation code.

The site file may also include instructions that determine how often new rules and data about the browser should be retrieved.

The site file can be a cached copy that loads new rules and data without the rules evaluation code.

The site file may include instructions that determine how often new data about the browser should be requested from one or more third party data sources and the rules can indicate that new third party data are needed and data from the one or more third party sources is requested and the browser records in local temporary storage an attribute that indicates that new data about the browser is available and a new copy of the site file must be retrieved from the rules server. The browser can retrieve the new third party data by requesting a rules file with the new data without the rules evaluation code from the rules server.

The rules server can be deployed in one or more locations selected to reduce latency of responding to requests from the browser.

The rules server may insert data into the site file to which the rules server has access but which code in the site file executing on the browser as part of content requested from the publisher server does not have access.

The browser can execute code in the site file to determine signals for all possible ad types it may encounter and sends those signals to the publisher ad server.

The requested file can be downloaded from a publisher ad server and the executable code in the site file can instruct the browser to retrieve an advertisement from a network ad server. A different advertisement may be retrieved from the publisher ad server if no signal is selected based on the rules.

A different advertisement may be retrieved from the publisher ad server if the highest value associated with each signal selected based on the rules is below a threshold established by a publisher.

Code executing in content markup language files retrieved from the rules server and the publisher server may have access to different sets of locally stored data, a first request for the file executes code with access to locally stored data available to the publisher server and a second request for the file executes code with access to locally stored data available to the rules server.

Process 100 may be modified such to requesting a file from a publisher server, receiving the requested file in a browser, the requested file including instructions for the browser to request a tag file of executable code from a rules server and receiving the tag file including one section containing executable code and a second section containing content markup language with embedded executable code, the tag file containing instructions for the browser to ignore the section of the tag file containing the content markup language with embedded executable code when the browser is processing the file as the executable code, the section with the executable code surrounded by characters indicating that the browser should ignore that section when the browser is processing the tag file as a content markup language file. A second request for the tag file as a document markup language file can retrieve a locally stored copy of the tag file.

Embodiments of the invention can be implemented in digital electronic circuitry, or in computer hardware, firmware, software, or in combinations of them. Embodiments of the invention can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Method steps of embodiments of the invention can be performed by one or more programmable processors executing a computer program to perform functions of the invention by operating on input data and generating output.

Method steps can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry.

The foregoing description does not represent an exhaustive list of all possible implementations consistent with this disclosure or of all possible variations of the implementations described. A number of implementations have been described. Nevertheless, it will be understood that various modifications may be made without departing from the spirit and scope of the systems, devices, methods and techniques described here. For example, various forms of the flows shown above may be used, with steps re-ordered, added, or removed. Accordingly, other implementations are within the scope of the following claims.

What is claimed is:

1. A method including:
    sending a request for a file from a browser residing on a user system to a publisher server;
    receiving, via the browser, the requested file from the publisher server, the requested file including instructions for the browser to request a site file from a rules server;
    receiving, via the browser, the site file from the rules server based on the instructions executed via the browser, the site file including rules for deciding whether an advertising impression in the browser is desired, rules for valuing the advertising impression, and browser executable code that applies and evaluates the rules;
    executing, via the browser, the browser executable code to apply and evaluate the rules from the site file which determine if one or more signals should be attached to an advertisement request;
    interpreting, via the publisher server, a received signal from the browser based on the executing; and
    selecting, via the publisher server, an advertisement from a network ad server based on the signal received with the advertisement request from the browser.

2. The method of claim 1 wherein the rules in the site file received in the browser depend on data about the browser gathered over time and across multiple servers in the network.

3. The method of claim 1 wherein the rules in the site file received in the browser depend on characteristics of the ad request.

4. The method of claim 1 wherein the rules in the site file received in the browser depend on how many times each signal has previously been included in ad requests from the browser to the publisher ad server.

5. The method of claim 1 wherein the rules in the site file received in the browser depend on one or more characteristics of content within which the advertisement is displayed, including the Universal Resource Locator (URL) or other unique identifier of the content, codes that correlate to a subject, nature and format of the content, an identity and role of a business entity in an authorship, production, edition and distribution of the content.

6. The method of claim 1 wherein the rules in the site file received in the browser depend on a location and placement of the advertisement within content.

7. The method of claim 1 wherein the rules in the site file received in the browser depend on a geographic location of the browser.

8. The method of claim 1 wherein the rules in the site file received in the browser depend on rules which cause the signals to be included on only a percentage of the ad requests when the signal would otherwise have been included.

9. The method of claim 1 wherein the rules in the site file received in the browser depend on rules which cause the signals to be included on the ad requests when a combination of available data predict a likelihood of a specific goal above a threshold.

10. The method of claim 9 wherein the available data is selected from the group consisting of data about the browser, ad request characteristics, content characteristics, characteristics of the actual advertising message, and a number of times the signal was previously included.

11. The method of claim 9 wherein the goal is a purchase transaction conducted using the browser.

12. The method of claim 9 wherein the goal is a purchase transaction linked to the available data but not conducted using the browser, including purchases made using other communications channels or in person.

13. The method of claim 9 wherein the threshold for including the signal based on a prediction also depends on a value assigned to the goal.

14. The method of claim 1 wherein files subsequently requested from the publisher server are retrieved from a locally cached copy of the site file if the subsequent requests happen within a prescribed period of time.

15. The method of claim 1 further including:
    requesting additional files from the publisher server; and
    receiving a locally cached copy of the site file if the subsequent requests happen within a prescribed period of time.

16. The method of claim 1 wherein the site file further comprises instructions that determine how often new data about the browser should be retrieved.

17. The method of claim 16 wherein the site file is a cached copy that loads new data without rules evaluation code.

18. The method of claim 1 wherein the site file further comprises instructions that determine how often new rules and data about the browser should be retrieved.

19. The method of claim 18 wherein the site file is a cached copy that loads new rules and data without the rules evaluation code.

20. The method of claim 1 wherein the site file further comprises instructions that determine how often new data about the browser should be requested from one or more third party data sources.

21. The method of claim 20 wherein the rules indicate that new third party data are needed and data from the one or more third party sources is requested and the browser records in local temporary storage an attribute that indicates that new data about the browser is available and a new copy of the site file must be retrieved from the rules server.

22. The method of claim 21 wherein the browser retrieves the new third party data by requesting a rules file with the new data without the rules evaluation code from the rules server.

23. The method of claim 1 wherein the rules server is deployed in one or more locations selected to reduce latency of responding to requests from the browser.

24. The method of claim 1 wherein the rules server inserts data into the site file to which the rules server has access but which code in the site file executing on the browser as part of content requested from the publisher server does not have access.

25. The method of claim 1 wherein the browser executes code in the site file to determine signals for all possible ad types it may encounter and sends those signals to the publisher ad server.

26. The method of claim 1 wherein the requested file is downloaded from a publisher ad server and the executable code in the site file instructs the browser to retrieve an advertisement from a network ad server.

27. The method of claim 26 further including retrieving a different advertisement from the publisher ad server if no signal is selected based on the rules.

28. The method of claim 26 further including retrieving a different advertisement from the publisher ad server if the highest value associated with each signal selected based on the rules is below a threshold established by a publisher.

29. The method of claim 1 wherein code executing in content markup language files retrieved from the rules server and the publisher server have access to different sets of locally stored data, a first request for the file executes code with access to locally stored data available to the publisher server and a second request for the file executes code with access to locally stored data available to the rules server.

* * * * *